United States Patent
Mukai et al.

(10) Patent No.: US 7,429,802 B2
(45) Date of Patent: Sep. 30, 2008

(54) VEHICLE-USE GENERATOR

(75) Inventors: Takuzou Mukai, Handa (JP); Shin Kusase, Oobu (JP)

(73) Assignee: Denso Corporation, Kariya (JP)

( * ) Notice: Subject to any disclaimer, the term of this patent is extended or adjusted under 35 U.S.C. 154(b) by 83 days.

(21) Appl. No.: 11/517,284

(22) Filed: Sep. 8, 2006

(65) Prior Publication Data

US 2007/0057514 A1 Mar. 15, 2007

(30) Foreign Application Priority Data

Sep. 12, 2005 (JP) .............................. 2005-263662

(51) Int. Cl.
*H02K 1/22* (2006.01)
(52) U.S. Cl. ........................ 290/43; 310/114
(58) Field of Classification Search ............... 290/40 C; 310/114
See application file for complete search history.

(56) References Cited

U.S. PATENT DOCUMENTS

| | | | | |
|---|---|---|---|---|
| 2,006,172 A | * | 6/1935 | Klappauf | 310/166 |
| 3,444,410 A | * | 5/1969 | Crawford | 310/262 |
| 4,785,213 A | * | 11/1988 | Satake | 310/116 |
| 4,882,515 A | * | 11/1989 | Radomski | 310/263 |
| 4,959,577 A | * | 9/1990 | Radomski | 310/263 |
| 4,980,595 A | * | 12/1990 | Arora | 310/263 |
| 5,177,388 A | * | 1/1993 | Hotta et al. | 310/114 |
| 5,293,089 A | * | 3/1994 | Frister | 310/54 |
| 6,455,976 B1 | * | 9/2002 | Nakano | 310/254 |
| 6,639,337 B1 | * | 10/2003 | Nakano | 310/113 |
| 6,795,287 B2 | * | 9/2004 | Kim et al. | 361/109 |
| 2003/0222513 A1 | * | 12/2003 | Kuribayashi | 310/19 |
| 2007/0247016 A1 | * | 10/2007 | Maekawa et al. | 310/263 |

FOREIGN PATENT DOCUMENTS

| | | |
|---|---|---|
| JP | A 1-157251 | 6/1989 |
| JP | A 5-137295 | 6/1993 |
| JP | A 5-308751 | 11/1993 |
| JP | A 2003-33093 | 1/2003 |

* cited by examiner

*Primary Examiner*—Joseph Waks
(74) *Attorney, Agent, or Firm*—Oliff & Berridge, PLC (57) ABSTRACT

The vehicle-use generator includes a first rotor core having a first field coil wound therearound, a second rotor core having a second field coil wound therearound, a rotating shaft belt-driven by a vehicle engine, the first and second rotor cores being mounted in tandem on the rotating shaft, a stator core having a stator coil wound therearound, and disposed radially outwardly of the first and second rotor cores so as to form a circumferential gap with the first and second rotor cores. The first and second field coils are connected substantially in parallel to each other when viewed from an external field current supply source supplying field currents to the first and second field coils.

7 Claims, 8 Drawing Sheets

FIG. 1

RELATED ART

VEHICLE-USE GENERATOR

CROSS-REFERENCE TO RELATED APPLICATION

This application is related to Japanese Patent Application No. 2005-263662 filed on Sep. 12, 2005, the contents of which are hereby incorporated by reference.

BACKGROUND OF THE INVENTION

1. Field of the Invention

The present invention relates to a vehicle-use generator, and more particularly to a vehicle-use generator including tandem rotor cores each of which has claw-shaped magnetic pole cores around which a field coil is wound.

2. Description of Related Art

There is known a vehicle-use generator having a tandem rotor structure in which two Lundell type rotors are tandem-connected (may be referred as a tandem type vehicle-use generator hereinafter), as disclosed, for example, in Japanese Patent Application Laid-open Nos. 1-157251, 5-137295, and 5-308751. Such a tandem rotor structure makes it possible to provide a compact and low-cost vehicle-use generator capable of outputting two different generation voltages that can be regulated individually. In other words, the tandem rotor structure makes it possible to greatly reduce the manufacturing cost and installation cost of a vehicle-use generator compared to a case where two different vehicle-use generators are installed separately.

However, such a tandem type vehicle-use generator has a problem in that a regulation speed of its generation voltage is slow, because the excitation circuit of the Lundell type rotor structure in which a field coil having a large number of turns is wound around claw-shaped pole cores exhibits a considerably large inductance, and accordingly exhibits a considerably large excitation time constant. This makes it difficult to keep the generation voltage at its target regulation voltage by adjusting an excitation current, when a consumption current of an electric load varies rapidly.

SUMMARY OF THE INVENTION

In one aspect of the invention the vehicle-use generator includes:

a first rotor core having a first field coil wound therearound;

a second rotor core having a second field coil wound therearound;

a rotating shaft belt-driven by a vehicle engine, the first and second rotor cores being mounted in tandem on the rotating shaft;

a stator core having a stator coil wound therearound, and disposed radially outwardly of the first and second rotor cores so as to form a circumferential gap with the first and second rotor cores;

wherein the first and second field coils are connected substantially in parallel to each other when viewed from an external field current supply source supplying field currents to the first and second field coils.

According to the one aspect of the invention in which field coils of a vehicle-use generator having the tandem rotor structure are connected in parallel with respect to an excitation current source, it is possible to greatly improve the output control responsiveness of the vehicle-use generator, because the excitation inductance of the entire excitation circuit of the vehicle-use generator can be significantly reduced compared to a conventional case where field coils of a vehicle-use generator are connected in series with respect to an excitation current source, In addition, since it is not necessary to reduce the turn number of each of the field coils, each field coil can have an ampere-turn value (excitation inductance) large enough to generate a required magnetic flux without increasing a field current flowing therethrough.

Incidentally, in a conventional vehicle-use generator having the tandem rotor structure, a plurality of field coils are connected in series to increase the composite excitation inductance of these coils to enable reducing a field current, so that temperature rise of the field coils can be suppressed. However, the inventor of the present invention has noticed that, in a vehicle-use generator having the tandem rotor structure, reducing the field current is less important, because, in the tandem rotor structure, the field coils are disposed in different spaces surrounded by different claw-shaped pole cores, and accordingly the field coils can be adequately cooled. In view of this fact, in the present invention, a plurality of the field coils are connected not in series but in parallel, to reduce the composite inductance of these field coils to improve the output control responsiveness of the vehicle-use generator.

In the another aspect of the invention the vehicle-use generator includes:

a rotor core having a field coil wound therearound;

a rotating shaft belt-driven by a vehicle engine, the rotor core being mounted on the rotating shaft;

a stator core having a stator coil wound therearound, and disposed radially outwardly of the rotor core so as to form a circumferential gap with the rotor core;

a rectifier rectifying an AC voltage induced in the stator coil into a DC voltage by which a vehicle battery is charged; and a regulator on-off controlling application of an excitation voltage to the field coil;

wherein the regulator is configured to produce the excitation voltage by stepping up an output voltage of the vehicle battery.

According to the another aspect of the invention in which a field coil of a vehicle-use generator is applied with an excitation voltage produced by stepping up an output voltage of a vehicle battery charged by the vehicle-use generator, it is possible to rapidly increase or decrease the field current compared to a conventional case where a field coil is applied with an output voltage of a vehicle battery. Accordingly, according to the another aspect of the invention, the output control responsiveness of a vehicle-use generator can be greatly improved without incurring high cost.

Other advantages and features of the invention will become apparent from the following description including the drawings and claims.

PREFERRED EMBODIMENTS OF THE INVENTION

Figure 1:
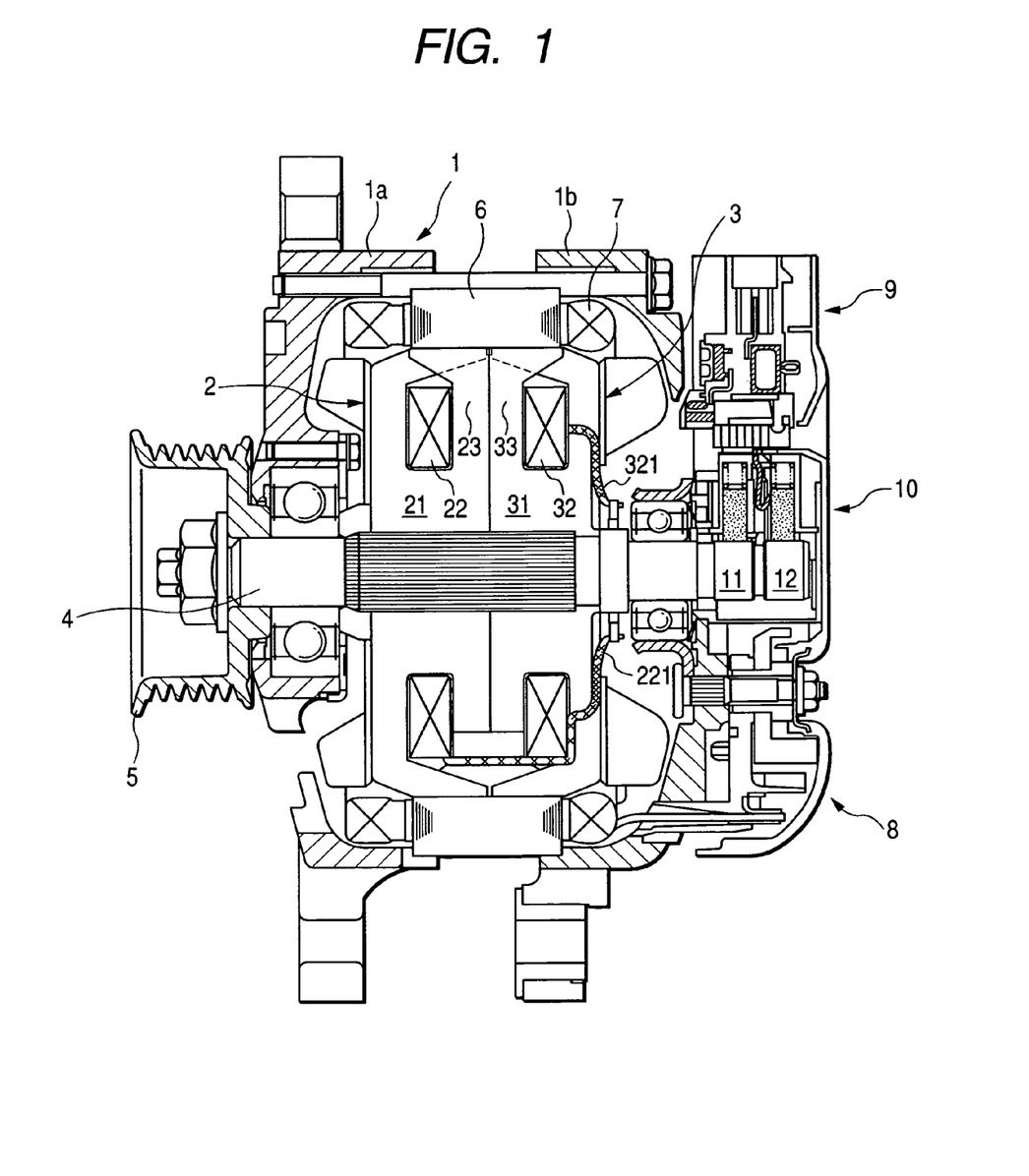
FIG. 1 is a schematic cross-sectional view of a vehicle-use generator according to a first embodiment of the invention.

FIG. 1 is a schematic cross-sectional view of a vehicle-use generator according to a first embodiment of the invention.

In FIG. 1, the reference numeral 1 denotes a housing, 2 denotes a first rotor section, 3 denotes a second rotor section, 4 denotes a rotating shaft, 5 denotes a pulley, 6 denotes a stator core, 7 denotes a stator coil, 8 denotes a rectifier, 9 denotes a regulator, and 10 denotes a slip ring device.

The housing 1 is constituted by a front housing 1a and a rear housing 1b fastened to each other by a through bolt. The rotating shaft 4 is supported by the housing 1 by means of bearings. The pulley 5 is fixed to the front-side end of the rotating shaft 4 protruding from the housing 1. The rectifier 8, regulator 9 and slip ring device 10 are fixed to the rear housing 1b in the rear of the second rotor section 3.

The first rotor section 2 includes a Lundell type rotor core 21 fitted to rotating shaft 4, and a field coil 22 wound around the rotor core 21. The rotor core 21 is constituted by a pair of claw-shaped pole core (may be referred to as claw portions hereinafter). The second rotor section 3 includes a Lundell type rotor core 31 fitted to rotating shaft 4 in the rear of the first rotor section 2, and a field coil 32 wound around the rotor core 31. The rotor core 31 is constituted by a pair of claw-shaped pole core (may be referred to as claw portions hereinafter).

Since the structure of such a Lundell type rotor core is well known, no further explanation of the rotor cores 21, 31 is not given here. For the same reason, no further explanations of the rectifier 8, regulator 9, and slip ring device 10 are given here.

The stator core 6 around which the stator coil 7 is wound is held in the axial direction between the front housing 1a and the rear housing 1b, and faces the rotor cores 21, 31 such that a circumferential electromagnetic gap is formed between the inner circumferential surface of the stator core 6 and the radially outer surfaces of claw portions of the rotor cores 21, 31. Accordingly, the field magnetic flux in the rotor core 21 generated by the field coil 22 and the field magnetic flux in the rotor core 31 generated by the field coil 32 link the common stator coil 7. The directions of the excitation currents respectively passed to the field coils 22, 32 are determined such that the claw portions of the rotor cores 21, 31 which are in the same circumferential position are excited to have the same magnetic polarity.

The both ends of the field coil 22 are respectively connected to a pair of slip rings 11, 12 of the slip ring device 10 through a coil lead 221. The both ends of the field coil 32 are also respectively connected to the slip rings 11, 12 of the slip ring device 10 through a coil lead 321. Accordingly, the field coil 22 and the field coil 32 are connected in parallel when viewed from the side of the slip rings 11, 12. This makes it possible to reduce the excitation inductance of the excitation circuit viewed from the side of the slip rings 11, 12, while ensuring large turn numbers of the field coils 22, 32. As a result, the values of the excitation currents, that is, the amounts of the field magnetic fluxes can be promptly changed, and accordingly, the value of the output current of the vehicle-use generator and the load torque of the vehicle-use generator which is in a positive correlation with this output current can be promptly changed.

The features of the vehicle-use generator having the above described tandem rotor structure are further explained in detail below in comparison to a conventional vehicle-use generator having a Lundell type rotor structure shown in FIG. 2. Here, it is assumed that the rotor diameter and the rotor axial length of the vehicle-use generator shown in FIG. 1 are the same as those of the vehicle-use generator shown in FIG. 2.

Figure 2:
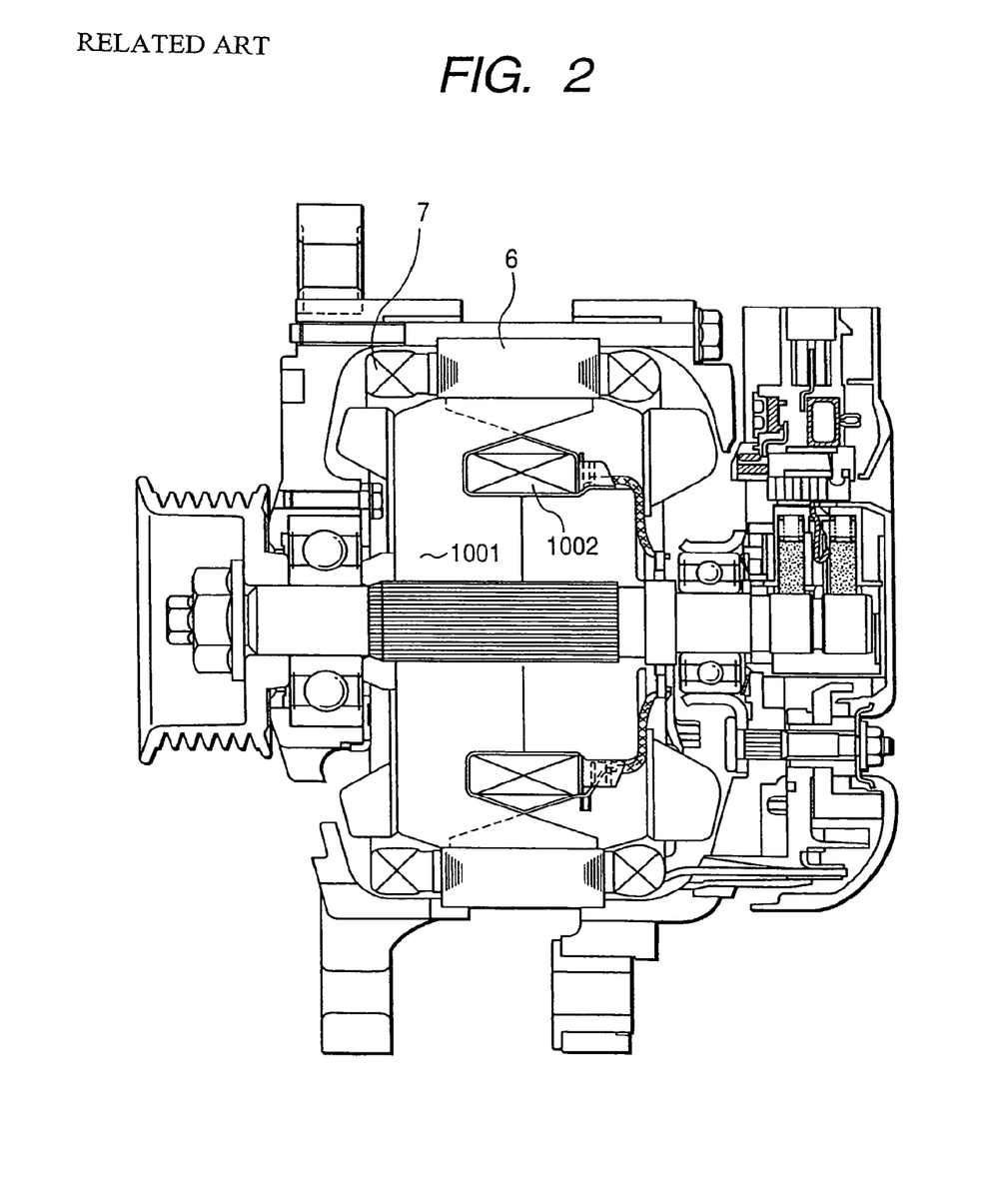
FIG. 2 is a schematic cross-sectional view of a conventional vehicle-use generator having a Lundell type rotor structure.

Since the amount of each of the field magnetic fluxes in the rotor cores 21 and 31 shown in FIG. 1 can be a half of the amount of the field magnetic flux in the rotor core 1001 shown in FIG. 2, the radius of the boss portions and the radial height of the claw portions of the rotor cores 21, 31 can be made significantly smaller than those of the rotor core 1001. Accordingly, since the space (indicated by X in FIG. 1) for housing the field coils in the tandem rotor structure shown in FIG. 1 can be increased by the reduced amount of the mass of the rotor core iron, this space can be made roughly twice as large as the space (indicated by X in FIG. 2) for housing the field coil in the conventional rotor structure shown in FIG. 2.

In the conventional rotor structure shown in FIG. 2, when the total magnetic resistance of the magnetic circuit excited by the field coil 1002 is R, the turn number of the field coil 1002 is N, and the maximum excitation current amount of the field coil 1002 is imax, the maximum magnetic flux amount Φmax is given by the equation of Φmax=N–imax/R. As described above, the maximum magnetic flux amount to be generated by the field coil 22 in the tandem rotor structure shown in FIG. 1 may be a half of that to be generated by the field coil 1002 in the conventional rotor structure shown in FIG. 2. In the tandem rotor structure shown in FIG. 1, the total magnetic resistance R' of the magnetic circuit excited by the field coil 22 is equal to the sum of a composite gap magnetic resistance Rg of two series electromagnetic gaps, a magnetic resistance Rr of the rotor core 21, and a magnetic resistance Rs of the stator core 6. The magnetic resistance R' of the magnetic circuit excited by the field coil 22 is equal to about 2R, because the cross sectional area thereof in the electromagnetic gaps is about a half of that of the magnetic circuit excited by the field coil 1002 shown in FIG. 2, and accordingly the composite gap magnetic resistance Rg of the magnetic circuit excited by the field coil 22 is about twice that of the magnetic circuit excited by the field coil 1002.

Hence, when the turn number N and the maximum excitation current amount of the field coil 22 shown in FIG. 1 are the same as those of the field coil 1002 shown in FIG. 2, the field coil 22 generates a field magnetic flux whose amount is about a half of that generated by the field coil 1002, and the sum of the maximum magnetic flux amounts generated by the field coils 22, 32 is equal to the maximum magnetic flux amount Φmax generated by the field coil 1002 alone. Accordingly, the maximum output power of the vehicle-use generator shown in FIG. 1 is equal to that of the vehicle-use generator shown in FIG. 2.

The inductance of the field coil 1002 shown in FIG. 2 is N·N/R, while the inductance of the field coil 22 shown in FIG. 1 is N·N/R'=N·N/2R. When the inductance of the field coil 22 is equal to that of the field coil 32, and they are connected in parallel to each other, the composite inductance of these field coils 22, 32 viewed from the side of the slip rings 11, 12 is equal to a half of the inductance of the field coil 22, that is, a quarter of the inductance of the field coil 1002.

As understood from the above explanation, by connecting the field coils 22 and 32 in parallel to each other, it becomes possible to considerably reduce the excitation inductance of the Lundell type rotor core having the tandem rotor structure, while keeping the output power unchanged.

In other words, according to this embodiment, the field coil housing space can be significantly increased compared to the conventional vehicle-use generator shown in FIG. 2. In this embodiment, the obtainable increase of the field coil housing space is utilized to increase the turn numbers of the field coils 22, 32. And these field coils 22, 32 are connected in parallel to reduce their composite excitation inductance viewed from the side of the slip rings 11, 12, so that the time constant of the excitation circuit is reduced, to thereby improve the output control response of the vehicle-use generator. In addition, according to this embodiment, the man-hour for connection of coil leads between the field coils and the slip rings can be reduced, because the coil leads 221, 321 can be directly connected to the slip rings 11, 12, and it is not therefore necessary to provide the tandem rotor structure with a relay terminal for connection between the field coils 22, 32.

Figure 3:
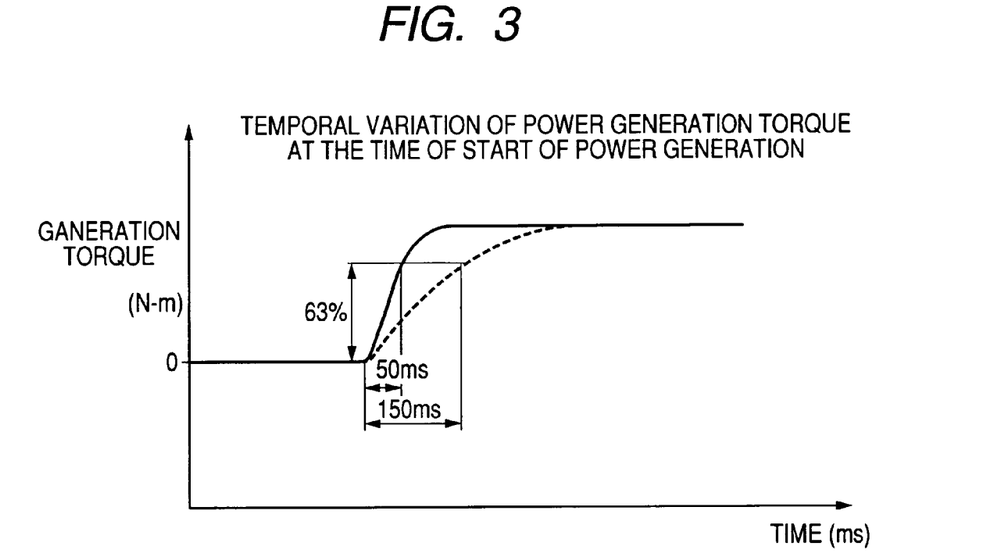
FIG. 3 is a graph showing measurement results of power generation torque at the time of start of power generation for each of the vehicle-use generator of the first embodiment, and the conventional vehicle-use generator.
Figure 4:
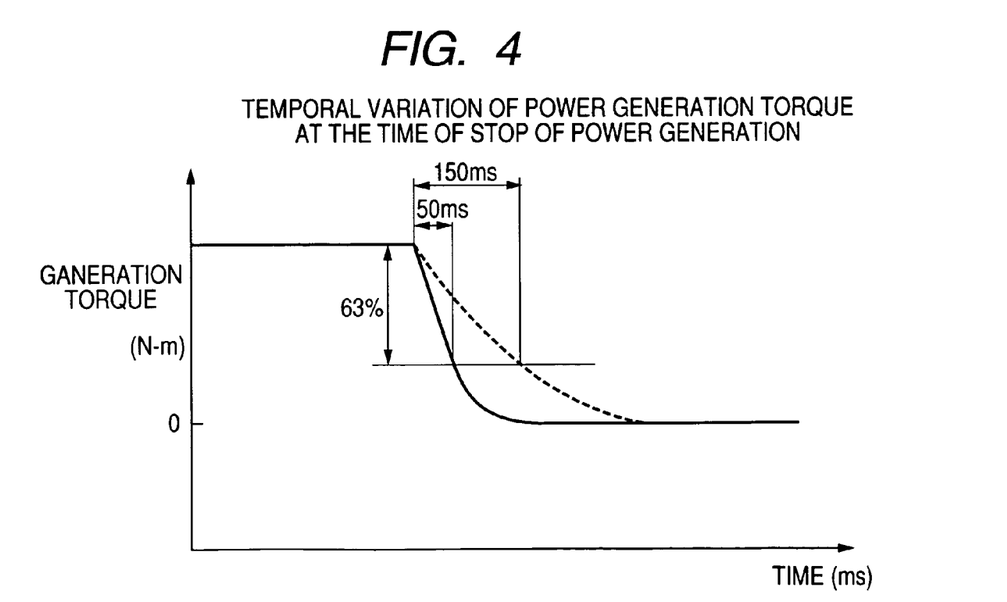
FIG. 4 is a graph showing measurement results of power generation torque at the time of stop of power generation for each of the vehicle-use generator of the first embodiment, and the conventional vehicle-use generator.

FIG. 3 is a graph showing measurement results of the power generation torque (the torque necessary to drive the vehicle-use generator) at the time of start of power generation for each of the vehicle-use generator of this embodiment having the tandem rotor structure shown in FIG. 1 in which its field coils are connected in parallel, and the conventional vehicle-use generator having the conventional rotor structure shown in FIG. 2. In this graph, the solid curve represents the temporal change of the generation torque of the vehicle-use generator of this embodiment, and the broken curve represents the temporal change of the generation torque of the conventional vehicle-use generator. As seen from this graph, the time for the generation torque to reach 63% of its maximum value in the vehicle-use generator of this embodiment is about one third that in the conventional vehicle-use generator FIG. 4 is a graph showing measurement results of the power generation torque at the time of stop of power generation for each of the vehicle-use generator of this embodiment having the tandem rotor structure shown in FIG. 1, and the conventional vehicle-use generator having the conventional rotor structure shown in FIG. 2. In this graph, the solid curve represents the temporal change of the generation torque of the vehicle-use generator of this embodiment, and the broken curve represents the temporal change of the generation torque of the conventional vehicle-use generator. As seen from this graph, the time for the generation torque to fall to 37% from its maximum value (100% value) in the vehicle-use generator of this embodiment is about one third that in the conventional vehicle-use generator In this embodiment, the magnetic polarity of the rear-side claw portions of the rotor core 21 is the same as the magnetic polarity of the front-side claw portions of the rotor core 31. However, they may be opposite to each other. In this case, the direction of the magnetic flux in a columnar portion 23 of the rotor core 21 is made opposite to the direction of the magnetic flux in a columnar portion 33 of the rotor core 31.

The circumferential positions of the rear-side claw portions of the rotor core 21 are preferably shifted relative to the circumferential positions of the front-side claw portions of the rotor core 31 by one magnetic pole pitch so that the axial width of the rear-side columnar portion 23 of the rotor core 21 and the axial width of the front-side columnar portion 33 of the rotor core 31 can be made small, to thereby further increase the field coil housing space.

In this embodiment, the parallel-connected field coils 22, 32 are supplied with the field currents from a vehicle battery (not shown) through the slip rings 11, 12 of the slip ring device 10, and the field currents respectively flowing into the field coils 22, 32 are on/off-controlled by a common switching element included in the regulator 9.

Alternatively they may be individually on/off-controlled by use of two switching elements. In this case, if the two switching elements are controlled synchronously, the field coils 22, 32 are connected in parallel to each other in effect when viewed from the side of the slip rings 11, 12. The two switching elements may be mounted on the housing side, although it becomes necessary for the slip ring device 10 to have three slip rings in this case.

Second Embodiment

Figure 5:
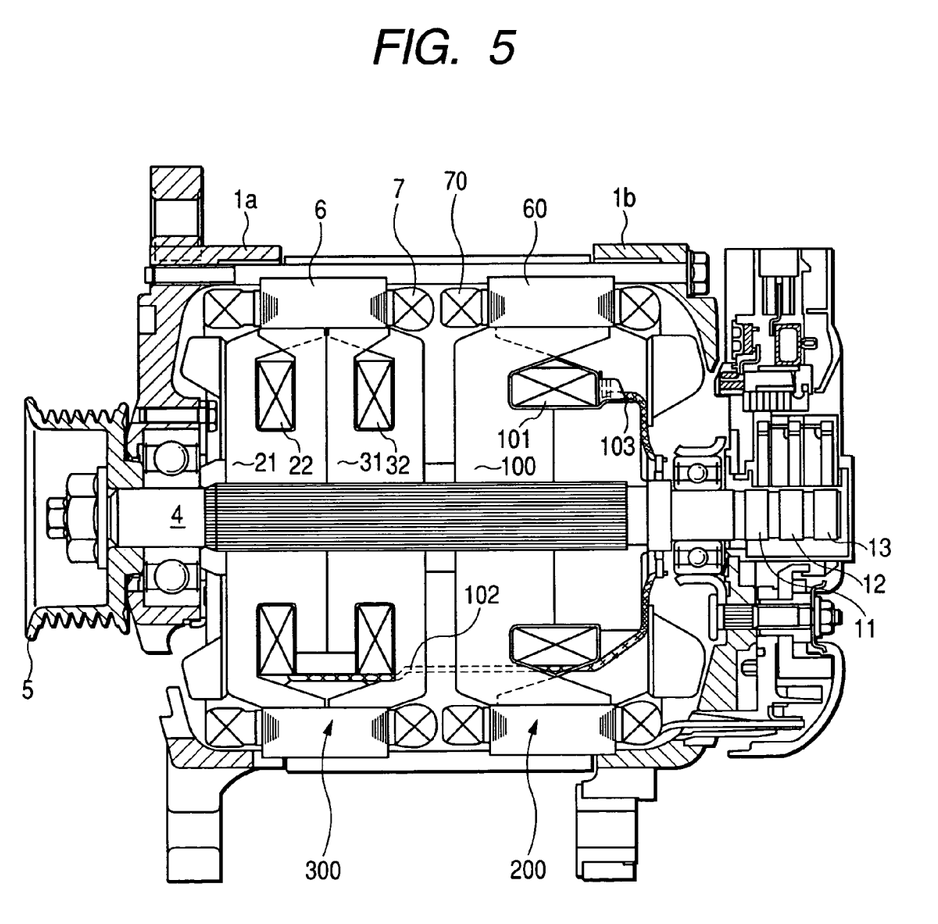
FIG. 5 is a schematic cross-sectional view of a vehicle-use generator according to a second embodiment of the invention.

FIG. 5 is a schematic cross-sectional view of a vehicle-use generator according to a second embodiment of the invention.

The second embodiment has a three-throw tandem rotor structure in which another Lundell type rotor core 100 is added to the rotor cores 21, 31 shown in FIG. 1. In FIG. 5, the reference numeral 101 denotes a field coil wound around the Lundell type rotor core 100, 60 denotes a stator core, 70 denotes a stator coil wound around the stator core 60. Here, the stator-rotor pair constituted by the Lundell type rotor cores 21, 31, the field coils 22, 32, the stator core 6, and the stator coil 7 is designated as a first stator-rotor pair 300, and the stator-rotor pair constituted by the Lundell type rotor core 100, the field coil 101, the stator core 60, and the stator coil 70 is designated as a second stator-rotor pair 200.

Figure 6:
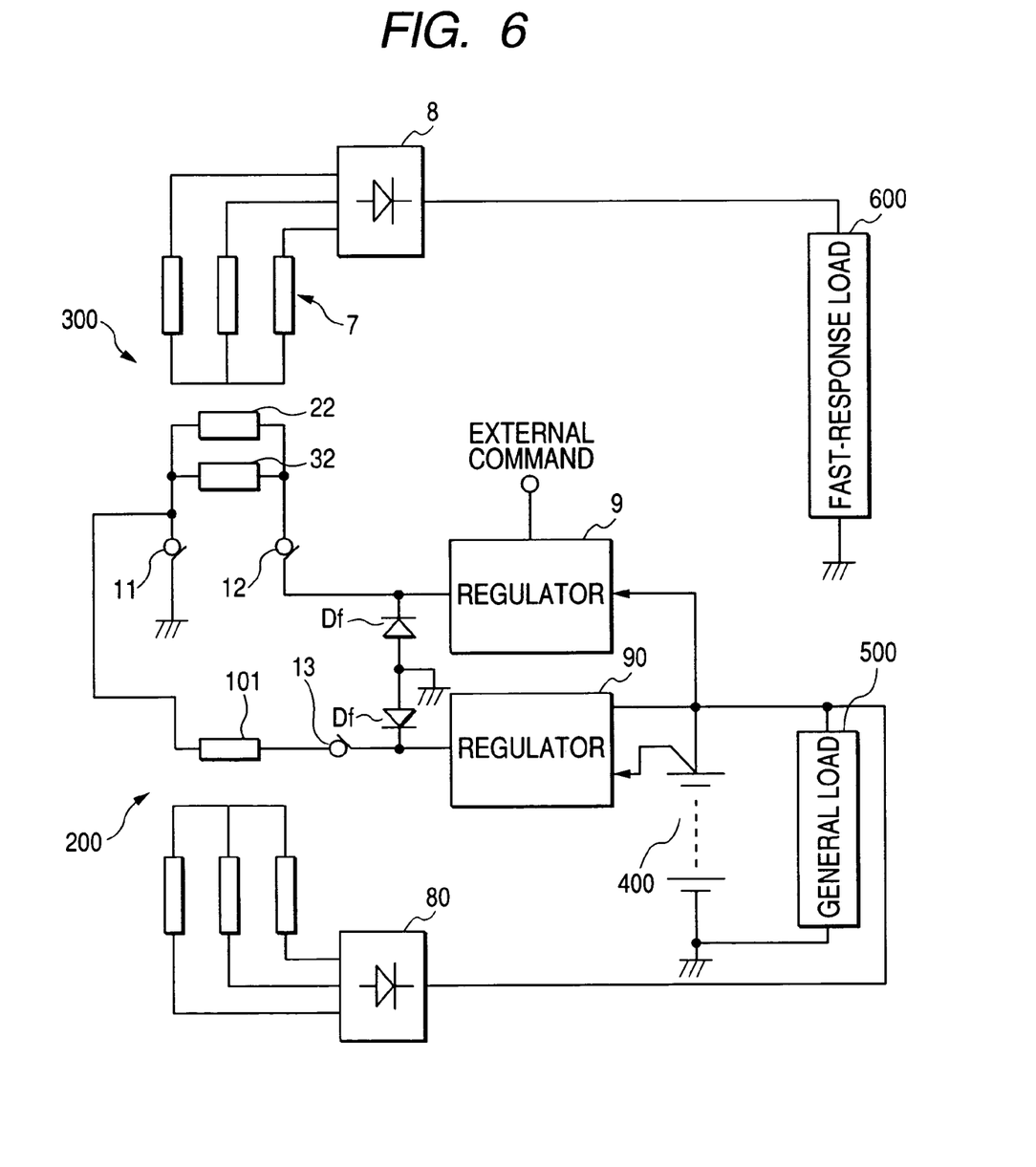
FIG. 6 is a circuit diagram showing an electrical structure of the vehicle-use generator of the second embodiment.

FIG. 6 is a circuit diagram showing an electrical structure of the vehicle-use generator of the second embodiment. As shown in this figure, the second stator-rotor pair 200 supplies electric power to a vehicle battery 400 and a general load 500 through a rectifier 80. A regulator 90 performs an on/off feedback control on an excitation current flowing into the field coil 101 to keep the voltage of the battery 400 constant.

On the other hand, the first stator-rotor pair 300 supplies, through the rectifier 8, electric power to a fast-response load 600 which is required to make a response at high speed. A signal indicative of the state of the fast-response load 600, and a drive command generated by an external electronic control unit (not shown) are inputted to the regulator 9. The regulator 9 on/off-controls the excitation current flowing into the field coils 22, 32 from the battery 400 in accordance with the drive command. In the second embodiment, since the first stator-rotor pair 300 having the high output control response speed supplies electric power only to the fast-response load 600 which is required to make a response at high speed, it becomes possible to reduce the ripple in the generation voltage applied to the battery 400.

Third Embodiment

Figure 7:
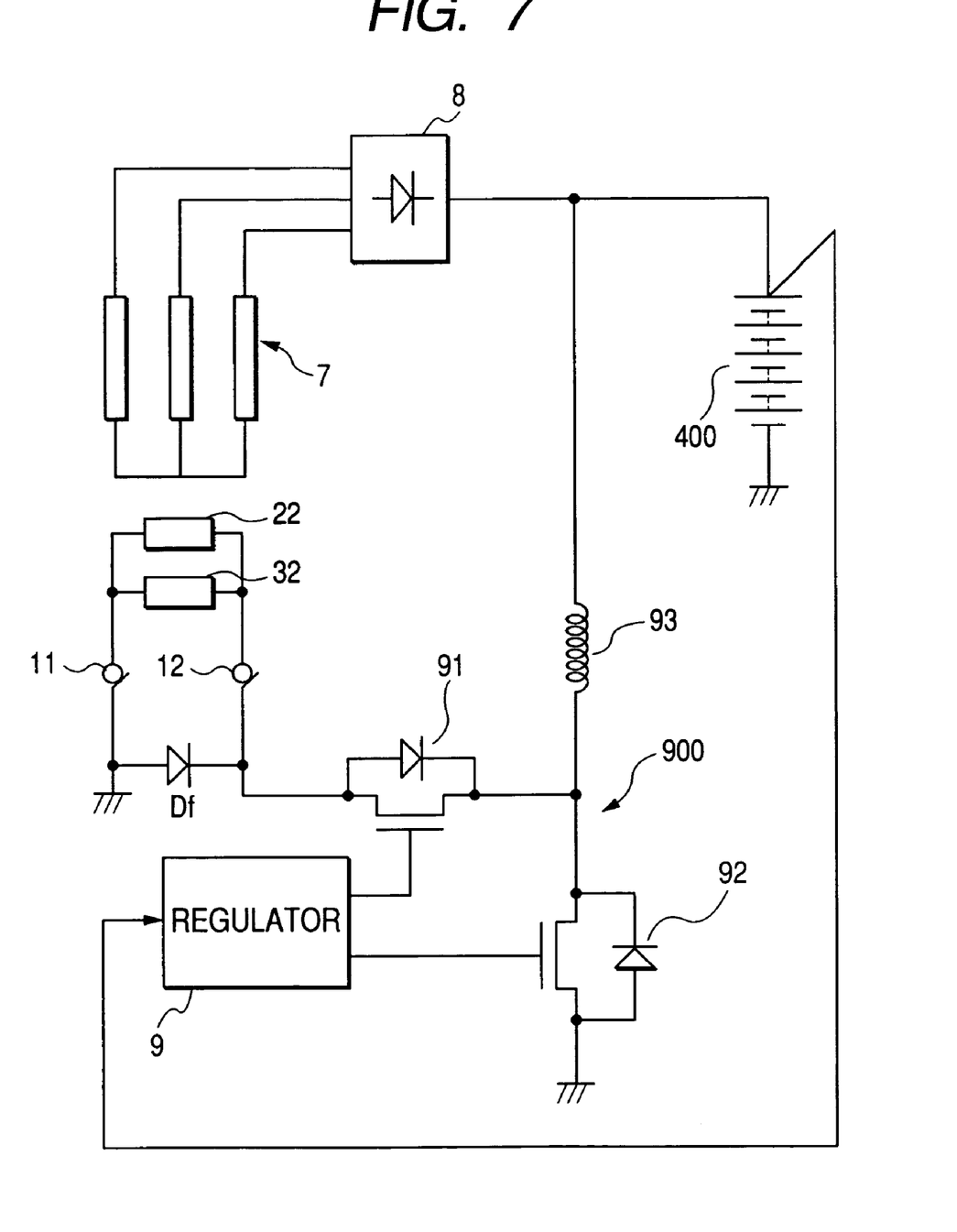
FIG. 7 is a circuit diagram showing an electrical structure of a vehicle-use generator according to a third embodiment of the invention.

FIG. 7 is a circuit diagram showing an electrical structure of a vehicle-use generator according to a third embodiment of the invention.

The third embodiment is different from the first embodiment in that a chopper type DC-DC converter 900 is provided for stepping up the voltage of the battery 400, and the field coils 22, 32 are applied with this stepped up voltage in the third embodiment. The DC-DC converter 900 is constituted by transistors 91, 92, and a reactor 93 for accumulation of magnetic energy.

The transistors 91, 92 of the DC-DC converter 900 are turned on and off at a certain frequency by the regulator 9. The voltage-step-up ratio of the DC-DC converter 900 is determined by the duty ratios of these transistors. When the transistor 92 is turned on, and the transistor 91 is turned off, magnetic energy is accumulated in the reactor 93. Subsequently, when the transistor 92 is turned off, and the transistor 91 is turned on, the field coils 22, 32 are applied with the stepped up voltage. According to the third embodiment, since the excitation current increase rate when the field currents start flowing into the field coils 22, 32, and the excitation current decrease rate when the field currents stops flowing into the field coils 22, 32 can be increased, the power supply responsiveness to the fast-response load 600 can be easily improved. Incidentally, in the third embodiment, the field coils 22, 32 may be replaced by a single field coil.

In a case where, in addition to the battery 400, a different vehicle battery whose output voltage is higher than that of the battery 400 is mounted in order to supply the excitation currents to the field coils 22, 32 therefrom, the DC-DC converter 900 can be eliminated.

Fourth Embodiment

Figure 8:
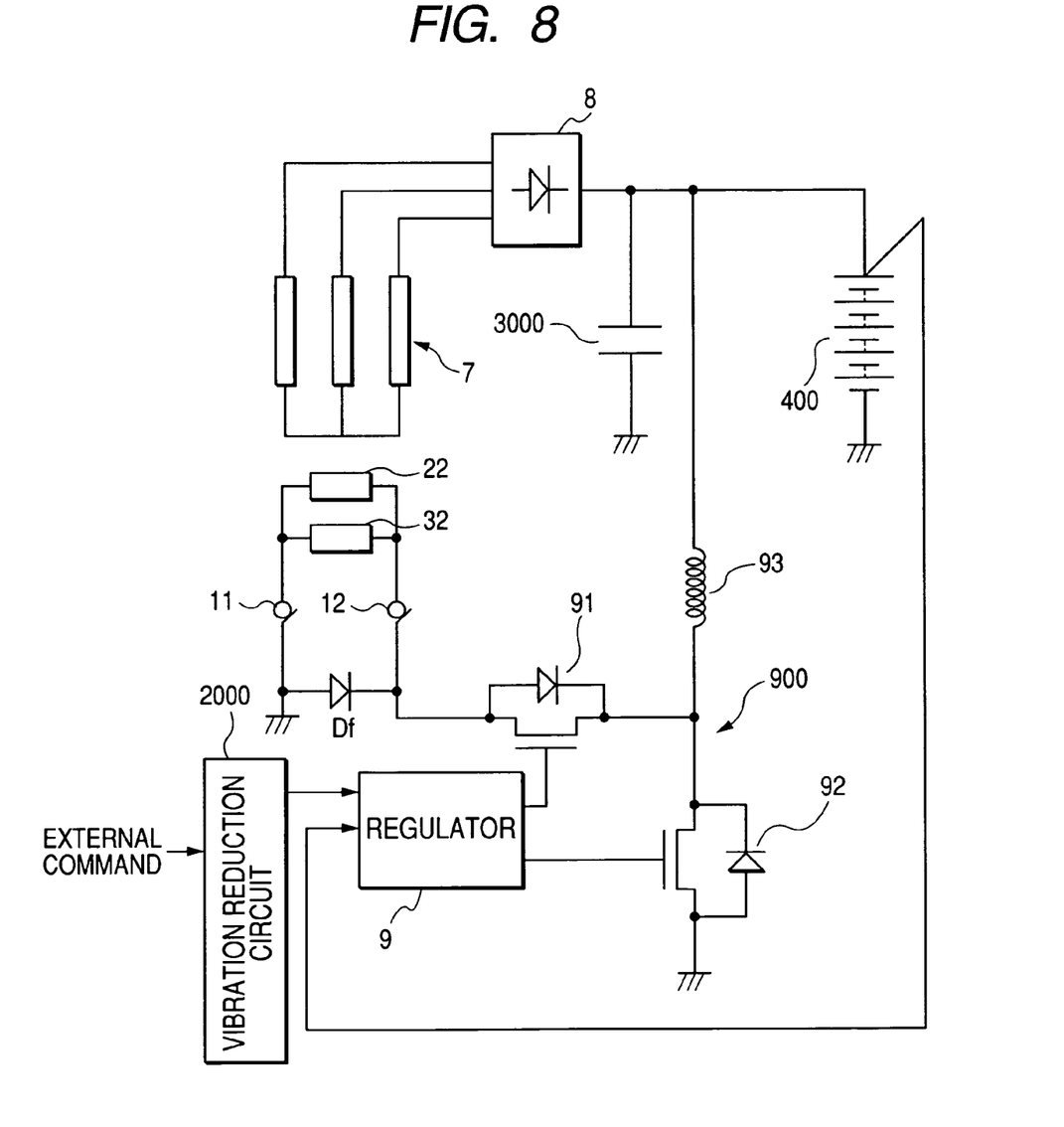
FIG. 8 is a circuit diagram showing an electrical structure of a vehicle-use generator according to a fourth embodiment of the invention.

FIG. 8 is a circuit diagram showing an electrical structure of a vehicle-use generator according to a fourth embodiment of the invention. The fourth embodiment is different from the third embodiment shown in FIG. 7 in that a vibration reduction circuit 2000 and an electric double-layer type smoothing capacitor 3000 having a large capacitance are additionally provided in the fourth embodiment.

The vibration reduction circuit 2000 is for reducing an engine vibration and a vehicle vibration caused by the engine vibration by controlling the phase of the power generation torque of the vehicle-use generator coupled to the engine through a belt-pulley mechanism which enables torque transmission therebetween. More specifically, the vibration reduction circuit 2000 controls the power generation torque such that the power generation torque and the engine torque vary in opposite phase to each other.

When the vibration reduction circuit 2000 receives a signal from outside indicative of a waveform of the engine output torque, it generates a power generation command signal whose phase is opposite to that of the waveform of the engine output torque, and applies it to the gates of the transistors 91, 92 of the DC-DC converter 900, as a result of which the phase of the field currents, and accordingly the phase of the power generation torque becomes opposite to that of the engine output torque. The electric double-layer type smoothing capacitor 3000 serves to absorb the ripple in the output voltage of the vehicle-use generator caused by the above described vibration reduction control in order to prevent the battery 400 from being deteriorated early on.

Fifth Embodiment

Figure 9:
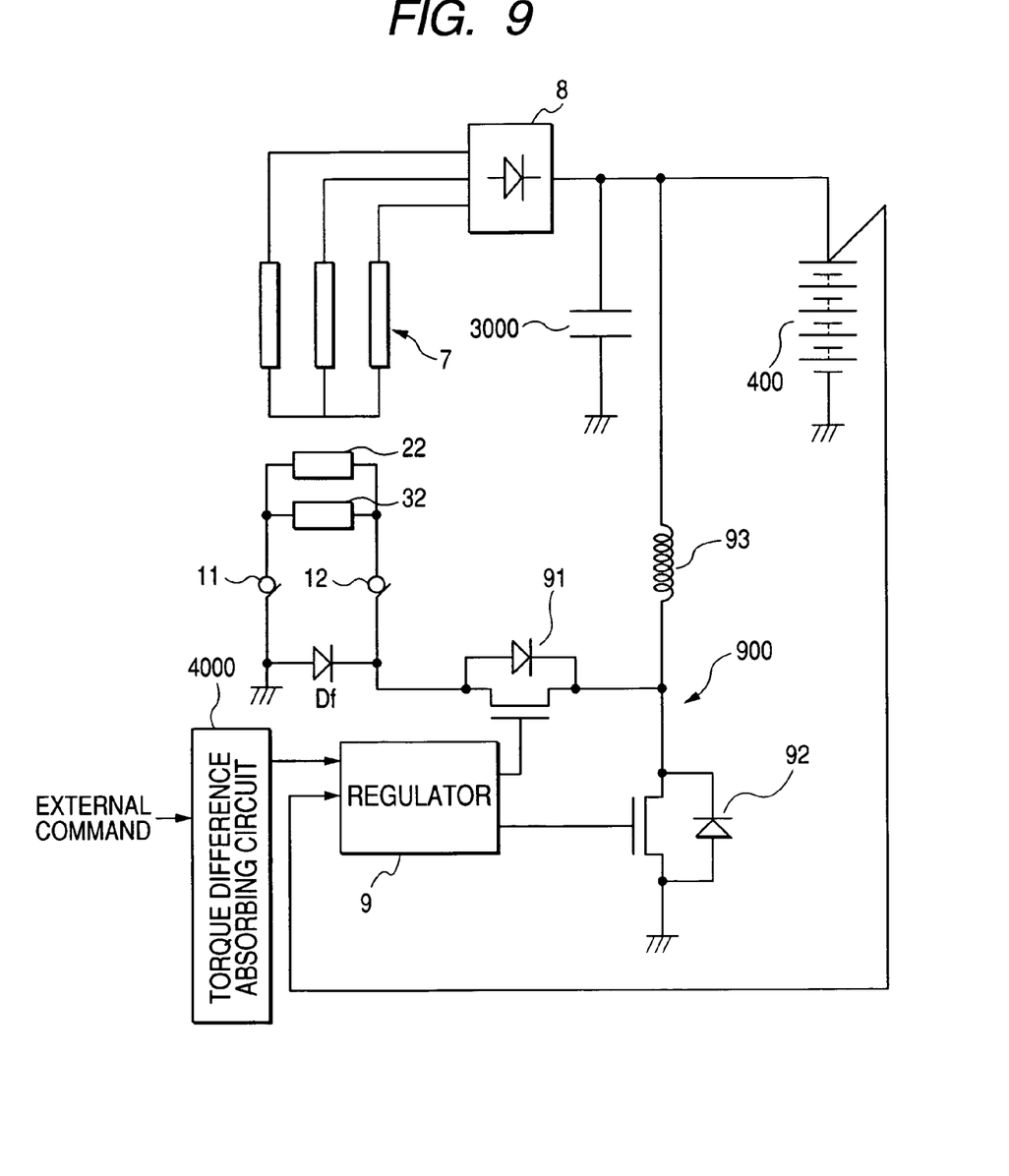
FIG. 9 is a circuit diagram showing an electrical structure of a vehicle-use generator according to a fifth embodiment of the invention.

FIG. 9 is a circuit diagram showing an electrical structure of a vehicle-use generator according to a fifth embodiment of the invention. The fifth embodiment is different from the fourth embodiment shown in FIG. 8 in that the vibration reduction circuit 2000 is replaced by a torque difference absorbing circuit 4000.

The torque difference absorbing circuit 4000 is for absorbing shock due to torque variation in the entire running mechanism of a vehicle, in particular, abrupt change of running load torque, by adjusting, in accordance with a torque difference (to be described later), the power generation torque of the vehicle-use generator coupled to a vehicle engine through a belt-pulley mechanism which enables torque transmission therebetween.

When a signal indicative of running load torque that can be determined from, for example, a value of wheel acceleration etc., and a signal indicative of an engine output torque are inputted to the torque difference absorbing circuit 4000, it judges whether or not the torque difference between part of the engine output torque used for driving wheels and the running load torque is in a certain allowable range determined depending on a depressed amount of a gas pedal. If the torque difference absorbing circuit 4000 judges that the torque difference is out of the allowable range, it adjusts the values of the excitation currents flowing into the field coils 22, 32 such that the torque difference enters the allowable range.

In order to simplify the calculations in the torque difference absorbing circuit 4000, the fifth embodiment may be so configured as to detect an abrupt change of the running load torque, and adjust the excitation currents flowing into the field coils 22, 32 to reduce the effect of the abrupt change of the running load torque on the engine, when it judges the detected abrupt change is out of a certain allowable range. This configuration makes it possible to rapidly reduce the output torque of the engine when the wheels slip and the running load torque rapidly decrease accordingly.

It is a matter of course that various modifications can be made to the above described embodiments. For example, in the fourth and fifth embodiments, the field coils 22, 32 may be applied with a high voltage of a high voltage battery instead of being applied with the stepped up voltage outputted from the DC-DC converter 900.

Incidentally, Df in FIGS. 6-9 denotes a flywheel diode.

The above explained preferred embodiments are exemplary of the invention of the present application which is described solely by the claims appended below. It should be understood that modifications of the preferred embodiments may be made as would occur to one of skill in the art.

What is claimed is:

1. A vehicle-use generator comprising:
   a first rotor core having a first field coil wound therearound;
   a second rotor core having a second field coil wound therearound;
   a rotating shaft belt-driven by a vehicle engine, said first and second rotor cores being mounted in tandem on said rotating shaft;
   a stator core having a stator coil wound therearound, and disposed radially outwardly of said first and second rotor cores so as to form a circumferential gap with said first and second rotor cores;
   wherein said first and second field coils are connected substantially in parallel to each other when viewed from an external field current supply source supplying field currents to said first and second field coils; and
   two regulators individually on/off-controlling said field currents supplied to said first and second field coils.

2. A vehicle-use generator comprising:
   a first rotor core having a first field coil wound therearound;
   a second rotor core having a second field coil wound therearound;
   a rotating shaft belt-driven by a vehicle engine, said first and second rotor cores being mounted in tandem on said rotating shaft;
   a stator core having a stator coil wound therearound, and disposed radially outwardly of said first and second rotor cores so as to form a circumferential gap with said first and second rotor cores;

wherein said first and second field coils are connected substantially in parallel to each other when viewed from an external field current supply source supplying field currents to said first and second field coils; and a vibration reduction circuit configured to adjust said field currents such that said field currents and an output torque of said vehicle engine vary in opposite phase.

3. A vehicle-use generator comprising:

a first rotor core having a first field coil wound therearound;

a second rotor core having a second field coil wound therearound;

a rotating shaft belt-driven by a vehicle engine, said first and second rotor cores being mounted in tandem on said rotating shaft;

a stator core having a stator coil wound therearound, and disposed radially outwardly of said first and second rotor cores so as to form a circumferential gap with said first and second rotor cores;

wherein said first and second field coils are connected substantially in parallel to each other when viewed from an external field current supply source supplying field currents to said first and second field coils; and a torque difference absorbing circuit configured to adjust said field currents such that a difference between wheel driving torque outputted from said vehicle engine and a running load torque of a vehicle on which said vehicle engine is mounted is kept in a certain range.

4. A vehicle-use generator comprising:

a first rotor core having a first field coil wound therearound;

a second rotor core having a second field coil wound therearound;

a third rotor core having a third field coil wound therearound;

a rotating shaft belt-driven by a vehicle engine, said first, second and third rotor cores being mounted in tandem on said rotating shaft;

a first stator core having a first stator coil wound therearound, and disposed radially outwardly of said first and second rotor cores so as to form a circumferential gap with said first and second rotor cores;

a second stator core having a second stator coil wound therearound, and disposed radially outwardly of said third rotor core so as to form a circumferentail gap with said third rotor core;

wherein said first and second field coils are connected substantially in parallel to each other when viewed from an external field current supply source supplying field currents to said first and second field coils.

5. The vehicle-use generator according to claim 4, wherein each of said first, second and third rotor cores has a plurality of claw-shaped pole core portions.

6. The vehicle-use generator according to claim 4, further comprising a common regulator on/off-controlling said field currents supplied to said first and second field coils.

7. The vehicle-use generator according to claim 4, further comprising two regulators individually on/off-controlling said field currents supplied to said first and second field coils.

* * * * *